United States Patent
Harriss

Patent Number: 6,131,604
Date of Patent: Oct. 17, 2000

[54] LOCKOUT DEVICE FOR SUBSURFACE VALVES

[76] Inventor: Michael W. Harriss, 15350 State Rte., 23 S., DeKalb, Ill. 60115

[21] Appl. No.: 09/422,606

[22] Filed: Oct. 21, 1999

[51] Int. Cl.[7] .................................................. F16L 35/00
[52] U.S. Cl. ..................... 137/382.5; 137/356; 137/377; 137/368; 137/363
[58] Field of Search ............................... 137/382, 382.5, 137/377, 363, 368

[56] References Cited

U.S. PATENT DOCUMENTS

| | | | |
|---|---|---|---|
| 4,702,275 | 10/1987 | Ballun et al. | 137/556 |
| 4,708,160 | 11/1987 | Sharp et al. | 137/368 |
| 5,070,895 | 12/1991 | Kelly | 137/1 |
| 5,234,029 | 8/1993 | Thomas et al. | 137/559 |
| 5,327,925 | 7/1994 | Ortel | 137/15 |

Primary Examiner—A. Michael Chambers
Assistant Examiner—Thomas L. McShane
Attorney, Agent, or Firm—John R. Hoffman

[57] ABSTRACT

A lockout device is designed for preventing unauthorized use of a valve located below ground level, the valve having a rotatable valve actuator. The device includes an elongated tubular housing of a length to have a lower end at the valve actuator and an upper end accessible generally at ground level. An encapsulating mechanism including a trap door are provided at the lower end of the tubular housing for securing the lower end to the valve and encapsulating the rotatable valve actuator, with the tubular housing being freely rotatable relative to the actuator.

12 Claims, 1 Drawing Sheet

LOCKOUT DEVICE FOR SUBSURFACE VALVES

FIELD OF THE INVENTION

This invention generally relates to a lockout device for preventing unauthorized use of buried or otherwise remotely located fluid control valves.

BACKGROUND OF THE INVENTION

In subsurface fluid distribution systems, such as water mains and supply pipes for fire control systems, it is often necessary to place manually operable control valves in locations that are remote from a manual access point. In other words, the valves often are buried below ground level or otherwise remotely located. In commercial buildings or other structures, the valve may be located below a concrete floor which is considered below "ground level" for purposes of this invention.

A typical fluid control valve, such as butterfly valves or the like, includes a rotatable valve member in the fluid line, with a valve stem projecting upwardly from the line. A valve actuator is fixed to the valve stem and often comprises a polygonal nut which is engageable by an appropriate wrench-like tool for rotating the valve. With buried valves, the wrench has an elongated shaft which terminates in a handle above ground level for rotating the subsurface valve.

It is highly desirable to provide some form of lockout or anti-tampering device for preventing unauthorized use of such buried valves. Unfortunately, most anti-tampering devices for valve stems have been designed for above ground applications because of the prevalence of tampering with such valves, such as common fire hydrants. There are few lockout or anti-tampering devices which are applicable for subsurface applications and those devices are relatively complicated and expensive.

There is a definite need for a simple lockout device for subsurface applications, and the present invention is directed to satisfying that need.

SUMMARY OF THE INVENTION

An object, therefore, of the invention is to provide a new and improved, simple and inexpensive lockout device for preventing unauthorized use of a valve located below ground level, with the valve having a rotatable valve actuator.

In the exemplary embodiment of the invention, the lockout device includes an elongated tubular housing of a length to have a lower end at the valve actuator and an upper end accessible generally at ground level. Encapsulating means are provided at the lower end of the tubular housing for securing the lower end to the valve and encapsulating the rotatable valve actuator. The encapsulating means provides for the tubular housing to be freely rotatable relative to the actuator.

The encapsulating means at the lower end of the tubular housing include a slotted opening for receiving a stem of the rotatable valve actuator, with the actuator captured within the housing. The stem simply is inserted into the slotted opening and allows the tubular housing to freely rotate relative to the valve actuator.

The encapsulating means also include a trap door for blocking the slotted opening after the valve stem is received therein and the actuator is captured in the housing. An operator is operatively associated with the trap door and extends upwardly toward the upper end of the tubular housing. As disclosed herein, the operator comprises a rod extending alongside the tubular housing. The rod includes a manually manipulatable handle at an upper end thereof. The operator includes a locking flange at an upper end thereof to facilitate locking the operator against the tubular housing and prevent unauthorized operation.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
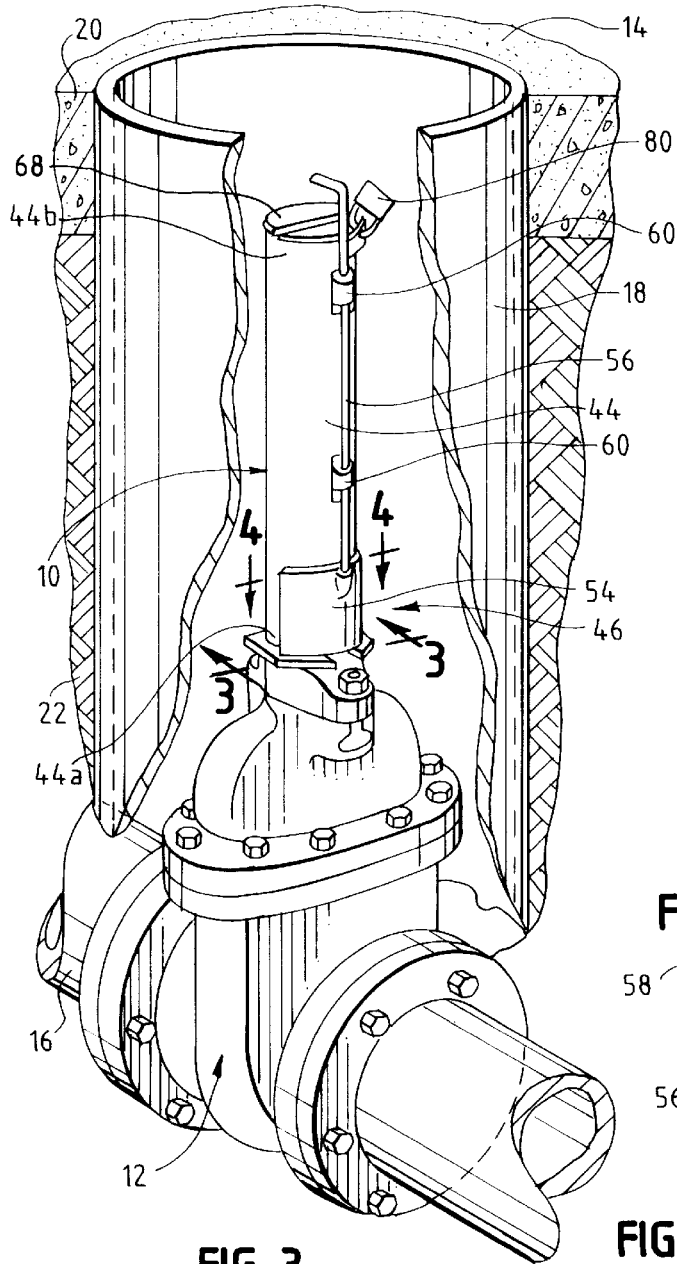
FIG. 1 is a perspective view showing the lockout device of the invention locked to a subsurface valve within a standpipe and with the ground broken away to facilitate the illustration.

Referring to the drawings in greater detail, and first to FIG. 1, the invention is embodied in a lockout device, generally designated 10, for preventing unauthorized use of a valve, generally designated 12, located below ground level 14. The valve is of conventional construction, such as a typical rotatable butterfly valve which is mounted in-line within a water main 16, for instance. Of course, the lockout device has a wide range of applications for various types of subsurface fluid control valves. With water line applications, such valves are buried below ground level sufficiently below the frost line to prevent freezing of the water in the pipes as well as the valves of the water distribution system. In addition, an enlarged cylindrical standpipe 18 extends from ground level 14 down to the valve to provide a clear or open working area to the valve from the ground level. FIG. 1 shows a thickness of concrete 20 above a depth of dirt 22 to show that the lockout device can be used in various applications wherein "ground level" may be at a paved location or even below a concrete floor of a structure.

Valve 12 has a typical rotatable valve actuator. Specifically, referring to FIGS. 2–4, a valve stem 24 (FIG. 3) projects upwardly from the housing and terminates in a rotatable valve actuator in the form of a square nut 26. The nut includes a radially outwardly extending lower flange 30.

An elongated valve operator, generally designated 36 (FIG. 2), is used to operate valve 12. The valve operator is in the form of a wrench which includes an elongated shaft 38 having a manually manipulatable handle 40 at the top thereof and a square socket 42 at the bottom thereof.

Shaft 38 is sufficiently long to reach the subsurface valve such that socket 42 easily can mate with actuator nut 26, while a person easily grasps handle 40 above ground to rotate the actuator nut and, thereby, the valve member within valve 12.

The lockout device 10 of the invention includes an elongated tubular housing 44 which is of a length to have a lower end 44a located at valve actuator 26 and an upper end 44b accessible generally at or slightly below ground level 14. The tubular housing can be fabricated of metal or plastic material and easily cut to length to accommodate valves buried at different depths.

Generally, encapsulating means, generally designated 46, are located at the lower end of tubular housing 44 for securing the lower end to valve 12. The encapsulating means encapsulates rotatable valve actuator nut 26. Once the device is secured to the valve, tubular housing 14 is freely rotatable relative to the valve and actuator nut 26.

Figure 2:
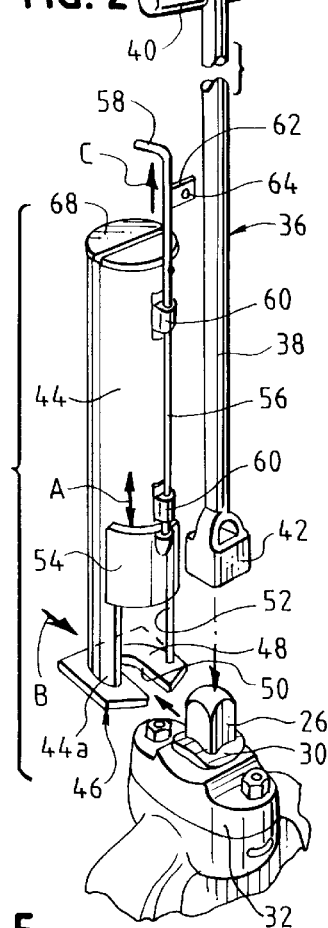
FIG. 2 shows the lockout device about to be assembled to the valve, in conjunction with an elongated wrench which is used to operate the valve.
Figure 3:
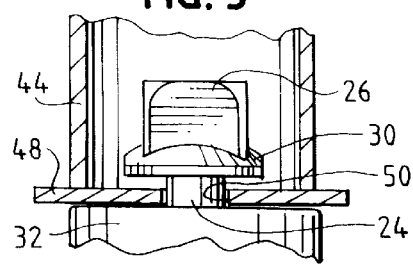
FIG. 3 is an enlarged, fragmented vertical section taken generally along line 3—3 of FIG. 1.
Figure 4:
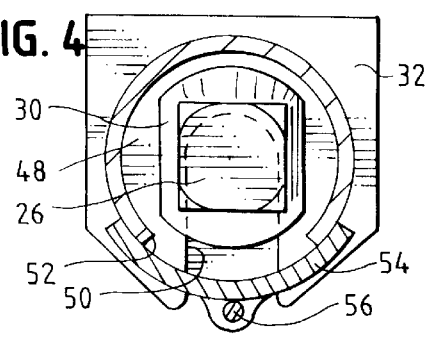
FIG. 4 is an enlarged, fragmented horizontal section taken generally along line 4—4 of FIG. 1.

More particularly, encapsulating means 46 includes a bottom wall 48 as seen in FIGS. 2–4. The bottom wall closes the lower end of tubular housing 44 except for a slotted opening 50. A side opening 52 is formed in the tubular housing at one side thereof in registry with and communicating with slotted opening 50. A trap door 54 is provided for opening and closing side opening 52. The trap door is vertically reciprocal in the direction of double-headed arrow "A" (FIG. 2). An operator in the form of an elongated rod 56 is fixed to the trap door and extends upwardly alongside the tubular housing on the outside thereof toward the upper end of the housing. A manually graspable handle 58 is provided at the upper end of rod 56. The rod is guided in reciprocating vertical movement through a pair of cylindrical guide bosses 60 on the outside of the tubular housing. As rod 56 is moved up and down, trap door 54 moves therewith. The trap door is arcuately shaped to conform to the cylindrical exterior configuration of tubular housing 44. Finally, a locking flange 62 is provided near the upper end of rod 56, the flange having a hole 64 therethrough, for purposes described hereinafter.

The mounting of lockout device 10 and valve 12 and the operation of encapsulating means 46 now will be described. First, the locking device is lowered into standpipe 18 until lower end 44a of tubular housing 44 is generally aligned with actuator nut 26 at the top of the valve.

The device then is moved generally horizontally in the direction of arrow "B" (FIG. 2) such that valve stem 24 (FIG. 3) enters slotted opening 50 in bottom wall 48. The bottom wall then will be positioned beneath flange 30 of actuator nut 26 as seen in FIG. 3. The device now cannot be lifted upwardly because of the abutment of bottom wall 48 with flange 30. However, the entire lockout device is freely rotatable relative to the valve and especially valve actuator 26. Trap door 54 which has been raised by rod 56 and handle 58 upwardly in the direction of arrow "C" (FIG. 2) to open side opening 52, now is allowed to drop downwardly to close side opening 52 and completely encapsulate or capture valve actuator nut 26 within the lower end of tubular housing 44. If there is any amount of binding between the parts, a person simply pushes down on handle 58 to force trap door 54 down to close side opening 52 and encapsulate the valve actuator. The trap door can be locked in its closed position, as will be described hereinafter.

A portion of the upper end of tubular housing 44 is closed by a fixed wall 68 which may cover approximately one-half of the upper end of the tubular housing. The other one-half of the upper end of the tubular housing is left open, but the opening is not large enough for the insertion of socket 42 of wrench 36 therethrough.

Figure 5:
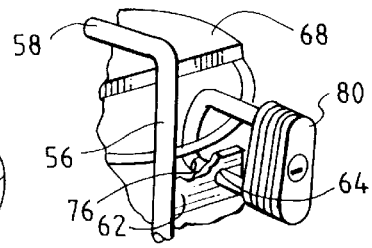
FIG. 5 is a fragmented perspective showing a lock used to lock the operator which controls the trap door at the lower end of the device.

FIG. 5 shows that a locking device 80, such as a conventional padlock, can be used at the upper end of the device to lock trap door 54 at the lower end of the device. The lock is inserted through the open upper end of the tubular housing, through a hole 76 in the housing wall and through hole 64 in locking flange 62.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A lockout device for preventing unauthorized use of a valve located below ground level, the valve having a rotatable valve actuator, comprising:

an elongated tubular housing of a length to have a lower end at the valve actuator and an upper end accessible generally at ground level; and encapsulating means at the lower end of the tubular housing for securing the lower end to the valve and encapsulating the rotatable valve actuator, with the tubular housing being freely rotatable relative to the actuator.

2. The lockout device of claim 1 wherein said encapsulating means include a slotted opening for receiving a stem of said rotatable valve actuator, with the actuator captured within the housing.

3. The lockout device of claim 2 wherein said encapsulating means include a trap door for blocking said slotted opening after said stem is received therein and the actuator is captured in the housing.

4. The lockout device of claim 3, including a n operator operatively associated with said trap door and extending upwardly toward the upper end of the tubular housing.

5. The lockout device of claim 4 wherein said operator comprises a rod extending alongside the tubular housing.

6. The lockout device of claim 5 wherein said rod includes a manually manipulatable handle at an upper end of the rod.

7. The lockout device of claim 4 wherein said operator includes means at an upper end thereof to facilitate locking the operator against unauthorized operation.

8. A lockout device for preventing unauthorized use of a valve located below ground level, the valve having a rotatable valve actuator, comprising:

an elongated tubular housing of a length to have a lower end at the valve actuator and an upper end accessible generally at ground level;

encapsulating means at the lower end of the tubular housing for securing the lower end to the valve, including a slotted opening for receiving a stem of the rotatable valve actuator with the actuator captured within the housing and the housing being freely rotatable relative to the actuator, and a trap door for blocking the slotted opening after the stem is received therein and the actuator is captured in the housing, thereby allowing access to the actuator only through the tubular housing from the upper end thereof; and a locking device at the upper end of the tubular housing for locking the trap door at the lower end of the tubular housing.

9. The lockout device of claim 8, including an operator operatively associated with said trap door and extending upwardly toward the upper end of the tubular housing.

10. The lockout device of claim 9 wherein said operator comprises a rod extending alongside the tubular housing.

11. The lockout device of claim 10 wherein said rod includes a manually manipulatable handle at an upper end of the rod.

12. The lockout device of claim 9 wherein said locking device is operatively associated with said operator.

* * * * *